Figure 1:
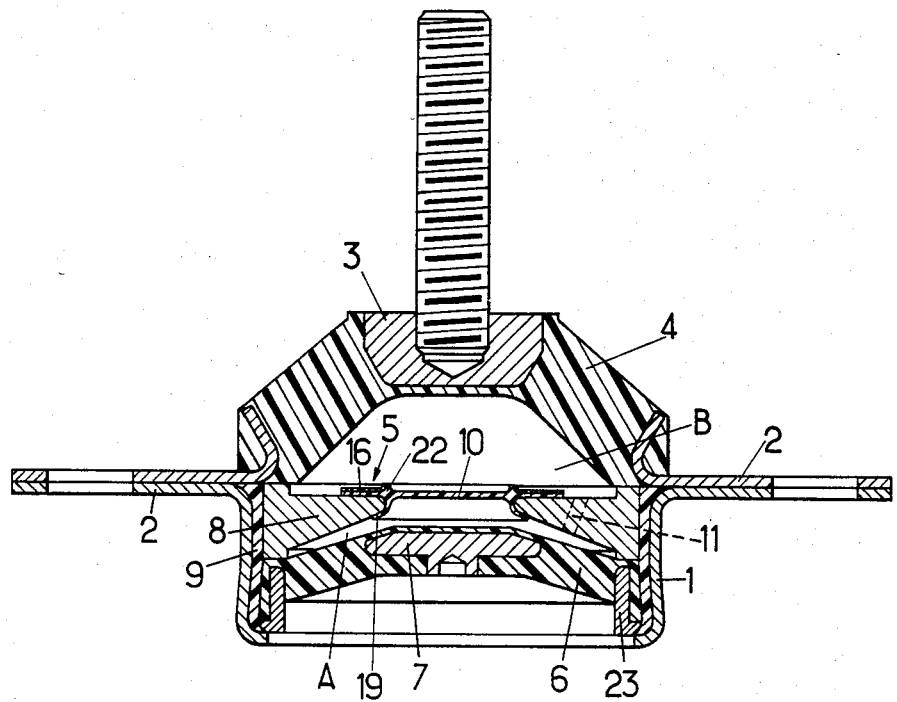

United States Patent [19]

Bernuchon et al.

[11] Patent Number: 4,511,126
[45] Date of Patent: Apr. 16, 1985

[54] HYDRAULIC MEMBRANE SHOCK ABSORBERS

[75] Inventors: Marc Bernuchon, Saint Leu La Foret; Michel Pompei, Paris; Daniel Gregoire, Chateaudun, all of France

[73] Assignee: Hutchinson, Paris, France

[21] Appl. No.: 471,303

[22] Filed: Mar. 2, 1983

[30] Foreign Application Priority Data

Mar. 3, 1982 [FR] France .................. 82 03546

[51] Int. Cl.³ ............. F16M 13/00; B60G 11/62; F16J 15/52
[52] U.S. Cl. ..................... 267/140.1; 248/562; 267/35; 403/50
[58] Field of Search .......... 267/8 R, 35, 64.13, 267/64.15, 64.23, 64.27, 136, 153, 140.1, 140.3, 140.4, 141, 141.2, 141.4, 63 R; 248/562, 563, 636; 180/300; 403/50, 51

[56] References Cited

U.S. PATENT DOCUMENTS 2,178,953  11/1939  Chilton ............... 267/64.27 X
2,192,355  3/1940   Kuhn ................. 267/64.27 X
3,135,506  6/1964   Wigan ................ 267/63 R X
4,437,653  3/1984   Kakimoto ............. 267/140.1

FOREIGN PATENT DOCUMENTS 0027751  4/1981  European Pat. Off. ......... 267/35

Primary Examiner—Bruce H. Stoner, Jr.
Assistant Examiner—Robert J. Oberleitner
Attorney, Agent, or Firm—Parmelee, Bollinger & Bramblett

[57] ABSTRACT

The shock absorber interposed between two pieces (1,3) comprises a sealed case with a deformable ring (4), a dividing wall (5) dividing the inside of the case into two compartments filled with liquid, a restricted passage (11) formed in a rigid ring (8) forming the periphery of the dividing wall and an impervious and continuous membrane (10) forming the center of the dividing wall. The periphery of one of the faces of the membrane is bonded to a flat annular bearing surface of the ring, a rigid floating washer (16) is added to the periphery of the other face of the membrane and two annular dividing walls (19 and 22) of the membrane mate on the inside with the ring and the washer.

10 Claims, 2 Drawing Figures

U.S. Patent    Apr. 16, 1985    4,511,126

HYDRAULIC MEMBRANE SHOCK ABSORBERS

The invention relates to devices for damping the relative reciprocating movements between two rigid elements and more particularly to those, of these devices, in which the damping depends on focusing a liquid through a restricted passage and for which the movements to be damped comprise on the one hand oscillations of relatively large amplitude (i.e. greater than a mm) at a relatively low frequency (i.e. less than 20 Hz) and on the other hand vibrations of relatively small amplitude (i.e. less than 0.5 mm) at a relatively high frequency (i.e. greater than 20 Hz).

By way of non limiting example, such shock absorbers may be fitted between a vehicle chassis and the engine of this vehicle, the relatively ample oscillations to be damped being those created by the unevennesses and variations of slope of the ground when the vehicle is travelling over this ground and the vibrations to be damped being those due to the operation of the engine.

The invention relates more particularly, among the shock absorbers of the kind in question, to those which are formed by a sealed case interposed between the two rigid elements, which case comprises two rigid pieces interlockable respectively with the two rigid elements, a dividing wall in which is formed the restricted passage, dividing the inside of the case into two compartments, a liquid mass filling one of the two compartments, called hereafter the first compartment and at least the part of the second compartment adjacent the dividing wall, means for sealingly connecting together the two rigid pieces while allowing relative reciprocating movements thereof with corresponding modification of the volume of at least the first compartment, a deformable membrane delimiting a part of this first compartment and means for limiting to a low amplitude, i.e. less than 0.5 mm, the deformations of this membrane.

With such a shock absorber, a vibration of high frequency and low amplitude exerted on the two rigid elements generates corresponding relative movements of the two rigid pieces, which are transmitted to the membrane by the liquid filling the first compartment and result in a rapid succession of alternate deformations of this membrane perpendicularly to itself, of an amplitude less than their maximum possible value: the dimensions of the membrane are in fact such that the liquid is then not driven to pass through the restricted passage in opposite directions in synchronism with said vibration.

On the contrary, for the oscillations of high amplitude and lower frequency, the amplitude of the corresponding deformations of the membrane reaches its maximum possible value and the liquid is then forced through the restricted passage, which provides the desired hydraulic damping in a way known per se.

The invention relates more particularly still to the case where the membrane is formed by a continuous tight or impervious and flexible foil whose edge is sealingly mounted on a rigid seat carried by the case, the restricted passage being formed in a portion of this case spaced from the membrane.

It concerns more precisely the membrane itself and the mode of mounting same on its seat, the aim of this invention being especially to improve the life-span of said membrane and to simplify mounting thereof.

To this end, the membrane shock absorber considered is, in accordance with the invention, essentially characterized in that the annular peripheral zone of one of the two faces of its membrane is applied axially and bonded against a flat annular rigid bearing surface forming the set of this membrane, and in that the annular peripheral zone of the other face of the membrane is covered with a rigid washer bonded floatingly to this zone.

In preferred embodiments, recourse is further had to one and/or the other of the following arrangements:

the membrane is made from rubber and is reinforced with a textile framework embedded in its thickness, the annular flat seat of the membrane is extended towards the axis of this seat by a rounded surface having no sharp edge of the semi-toric kind itself extended, in a direction away from the axis, by a truncated cone shaped surface, the membrane comprises an annular rib projecting from its face turned towards the seat, which rib is adapted to jointingly mate with at least the rounded surface according to the preceding paragraph, the membrane comprises an annular rib projecting from its face carrying the washer, the side with the largest diameter of this rib running jointingly along the inner edge of this washer, the inner edge of the washer is bent back axially in the direction away from the membrane, the radii of curvature of the outer surface of the raised edge of the washer and of the rounded surface extending the seat are identical, the radial width of the washer is at least equal to 5 mm, the axial thickness of the washer is between 0.5 and 2 mm.

The invention comprises, apart from these main arrangements, certain other arrangements which are preferably used at the same time and which will be more explicitly discussed hereafter.

In what follows, a preferred embodiment of the invention will be described with reference to the accompanying drawing in a manner which is of course in no wise limiting.

FIG. 1, of these drawings, shows in axial section a hydraulic membrane shock absorber constructed in accordance with the invention.

Figure 2:
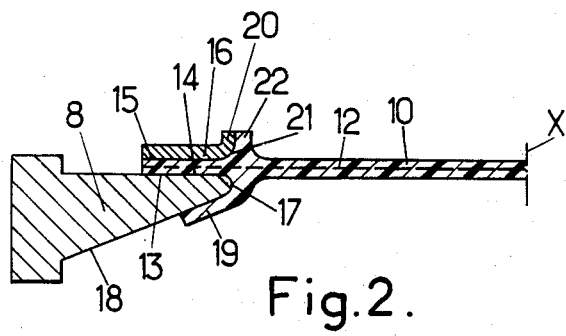

FIG. 2 shows in half axial section, on a larger scale, the membrane forming part of this shock absorber in accordance with the invention as well as its seat and its washer.

The shock absorber considered is intended to be interposed vertically between a rigid support such as a vehicle chassis and a supported member such as an internal combustion engine.

This shock absorber comprises a sealed case formed:

of a lower container 1 extended horizontally by two perforated lugs 2 firmly securable to the support, of a rigid cap 3 firmly securable to the supported member, and of an intermediate annular sealing member 4 made from rubber bonded respectively to the edges of container 1 and cap 3 and adapted to resiliently withstand the axial compression.

A dividing wall 5 divides the inside of the case into two compartments, a lower one A and the other upper one B, both filled with liquid.

The base of container 1 could be formed by a rigid bottom forming a single piece with the rest of this container if the construction were reversed with respect to the one considered here, said container then containing near its vault-forming bottom an air cushion, enclosed or not in a sealed bag, and compartment A defined by this container then forming the "second" compartment defined above (the "first" compartment still being deformable and full of liquid).

In the embodiment illustrated, the base of the container is formed by a relatively thick rubber disk 6 bulging slightly upwardly, in the central zone of which disk is embedded a metal insert 7. This disk is itself firmly secured to the shell forming the lateral wall of container 1 by crimping this shell over a metal ring 23 partially embedded in the peripheral zone of the disk in question.

The dividing wall 5, as far as it is concerned, is formed:

by a rigid ring 8 fitted into the shell forming container 1, with interpositioning of a rubber sleeve 9 bonded to this shell, and by a membrane 10 extending across the central opening defined by ring 8, which ring forms a seat for said membrane.

Ring 8 in question is perforated with at least one passage 11 of small calibrated section, which may extend helically or circularly inside the ring over an arc close to or even exceeding 360°, and which allows the two compartments A and B to be placed in communication.

It is essentially to membrane 10 and the mode of mounting same that the present invention relates.

In a way known per se, this membrane is resiliently flexible, impervious and continuous, that is to say unperforated.

In the relaxed condition, it may have a generally flat or slightly bulging shape.

It is advantageously formed by rubber or other elastic material reinforced by a textile framework 12 (FIG. 2) embedded in its thickness.

The presence of this framework presents the advantage of making the membrane non stretchable as soon as its degree of elastic deformation reaches a predetermined threshold: it is then useless to provide gratings or perforated screens for limiting its deformations, as in numerous known constructions.

The mounting of the membrane is effected by applying the annular peripheral zone 13 of one of its faces (i.e. its lower face in the drawings) axially against a flat facing annular supporting surface 14 defining the inner edge of ring 8 and by bonding together in any desirable way the two annular surfaces thus juxtaposed, more especially by vulcanization or reticulation of the membrane and/or by bonding by means of an intermediate bonding layer.

Furthermore—and this is one of the peripheral arrangements of the present invention—a rigid washer 16 is laid and bonded against the annular peripheral zone 15 of the face, of the membrane, opposite the one which has just been considered.

In the finished mounting (FIG. 1), the free outer face of this washer is not applied against any solid piece, being then directly in contact with the damping liquid contained in compartment B.

The Applicant has discovered suprisingly that the presence of this "floating" washer on the periphery of the membrane decisively increased the life-span of this membrane and suppressed the slapping noises due to its deformations.

The annular bearing surface 13 of ring 8 is extended in the direction of axis X of the ring by a rounded bearing surface 17 having the shape of a semi-tore truncated at its base, said bearing surface 17 being itself extended, away from axis X, by a truncated cone shaped bearings surface 18.

Membrane 10 itself has on its face turned towards the seat an annular rib 19 adapted to jointingly mate with the bearing surface 17 and even advantageously part of bearing surface 18, as can be seen in FIG. 2.

Washer 16 advantageously comprises an inner edge 20 bent back axially away from the seat, the outer surface 21 of the connecting zone between this bent back edge and the washer preferably having the same radii of curvature as the above bearing surface 17.

Moreover, membrane 10 has on its face turned towards the washer a second annular rib 22 adapted to mate jointingly with the internal edge of washer 16, that is to say the above-mentioned surface 21 as well as the internal surface of the bent back edge 20, if such a bent back edge is provided.

The life-span of the membrane equipped with these two ribs 19 and 22 is remarkable.

Moreover, the possible equality between the radii of curvature of the surfaces 17 and 21 makes the deformation and wear of this membrane identical for both directions of deflection thereof.

It will be further noted that the degree of rigidity of the membrane and so the amplitude of its deflection may be very simply adjusted by modifying the radial thickness of ribs 19 and 22, all other things being equal.

The adherence between each rib and the rigid parts along which it jointingly runs is advantageously provided in the same way as the adherence between the annular area 13 of the membrane and the flat bearing surface 14 of ring 8.

In particular, this adherence may be achieved when hot during the very manufacture of the membrane by vulcanization in a mold; the assembly of seat 8, membrane 10 mounted on this seat and washer 16 laid on this membrane may thus be able to be pre-manufactured before positioning of ring 8 forming the seat in shell 1.

Purely by way of information, it may be stated that, in an embodiment giving evwry satisfaction, for which the load of the supported member connected to cap 3 was of the order of 80 kg, the thickness of the membrane was of the order of 3 mm, the diameters of the circular openings defined by seat 8 and washer 16 were equal and both of the order of 30 mm, the radial width of the washer 16 was of the order of 8 mm and its axial thickness was of the order of 1 mm.

More generally, the thickness of the membrane is preferably greater than 2 mm and the radial width of the washer greater than 5 mm.

The textile framework is advantageously formed by a glass or polyester fabric or else by a gauze made from the superpolyamide known under the name of Nylon.

As for washer 16, it is formed from any desirable rigid material compatible with the damping liquid, such as a metal or plastic material.

The operation of the hydraulic membrane shock absorber described above is the one which has been indicated earlier: as long as it is a question of damping the vibrations, of the supported member, having a relatively high frequency and small amplitude (i.e. of the order of a tenth of a millimeter), the corresponding movements of the liquid mass contained in the shock absorber are totally compensated for by deformations of membrane 10 without the choking of this liquid through passage 11 being able to play any role.

On the other hand, when a relative movement between the support and the supported member is relatively slow and exceeds the amplitude corresponding to the maximum travel of membrane 10, the liquid is forced from one of compartments A and B into the other through passage 1, which then provides "hydraulic" damping in the conventional sense.

Following which, and whatever the embodiment adopted, there is finally provided a hydraulic membrane shock absorber whose construction, operation and advantages (in particular, the extended life-span of the membrane and the simplicity of its mounting) follow sufficiently from what has gone before.

As is evident, and as it follows moreover already from what has gone before, the invention is in no wise limited to those of its modes of application and embodiments which have been more especially considered; it embraces, on the contrary, all variations thereof.

We claim:

1. A device for damping the relative movements between two rigid elements, formed by a sealed case interposed between the two rigid elements, which case comprises two rigid pieces (1,3) interlockable respectively with the two rigid elements, a dividing wall (5) in which is formed a restricted passage (11), dividing the inside of the case into first and second compartments, a liquid mass filling the first compartment and at least the part of the second compartment adjacent the dividing wall, means (4) for connecting sealingly together the two rigid pieces while allowing relative reciprocating movements thereof with corresponding modification of the volume of at least the first compartment, a deformable membrane (10) delimiting a part of the first compartment and means for limiting to a low amplitude, which is less than 0.5 mm, the deformations of this membrane, said membrane being formed by a continuous impervious and flexible foil whose edge is sealingly mounted on a rigid seat forming part of the case and the restricted passage being formed in a rigid zone of the case spaced from the membrane, characterized in that the peripheral annular zone (13) of one of the two faces of the membrane (10) is applied axially and bonded against a flat annular rigid bearing surface (14) forming the seat of this membrane, and in that an annular peripheral zone (15) of the other face of the membrane is covered by a rigid washer (16) bonded floatingly to this zone.

2. The shock absorber according to claim 1, characterized in that the annular flat seat (14) of the membrane (10) is extended towards an axis (X) of this seat by a rounded surface with no sharp edge of a semi-toric type (17) itself extended, in a direction away from the axis, by a truncated cone shaped surface (18).

3. The shock absorber according to claim 2, characterized in that the membrane (10) comprises an annular rib (19) projecting from its face orientated towards the seat, which rib is adapted to mate jointingly with at least the rounded surface (17).

4. The shock absorber according to claim 1, characterized in that the membrane (10) comprises an annular rib (22) projecting from its face carrying the washer (16), the side of this rib having the largest diameter running jointingly along the inner edge of this washer.

5. The shock absorber according to claim 1, characterized in that the inner edge of the washer (16) is bent back axially (at 20) in the direction away from the membrane.

6. The shock absorber according to claim 2, characterized in that the inner edge of the washer (16) is bent back axially (at 20) in the direction away from the membrane.

7. The shock absorber according to claim 6, characterized in that the radii of curvature of the outer surface of the raised edge (20) of the washer and of the rounded surface (17) extending the seat are identical.

8. The shock absorber according to claim 1, characterized in that the radial width of the washer (16) is at least equal to 5 mm.

9. The shock absorber according to claim 1, characterized in that the axial thickness of the washer (16) is between 0.5 mm and 2 mm.

10. The shock absorber according to claim 1, characterized in that the membrane (10) is made from rubber and is reinforced by a textile framework (12) embedded in its thickness.

* * * * *